(12) United States Patent
Chen et al.

(10) Patent No.: US 11,776,262 B1
(45) Date of Patent: Oct. 3, 2023

(54) IDENTIFYING COMPELLING SCENES AT SCALE BY MAPPING CHARACTERISTICS

(71) Applicant: Amazon Technologies, Inc., Seattle, WA (US)

(72) Inventors: Kewen Chen, King, WA (US); Tu Anh Ho, Mercer Island, WA (US); Christina Botkins, Seattle, WA (US); Najmeh Sadoughi Nourabadi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 4 days.

(21) Appl. No.: 17/304,932

(22) Filed: Jun. 28, 2021

(51) Int. Cl.
  *G06V 20/40* (2022.01)
  *H04N 21/234* (2011.01)
  *H04N 21/25* (2011.01)
  *H04N 21/2668* (2011.01)
  *G06F 18/21* (2023.01)

(52) U.S. Cl.
  CPC .............. *G06V 20/41* (2022.01); *G06F 18/21* (2023.01); *G06V 20/46* (2022.01); *H04N 21/23418* (2013.01); *H04N 21/251* (2013.01); *H04N 21/2668* (2013.01)

(58) Field of Classification Search
  CPC ...... G06V 20/41; G06V 20/46; G06K 9/6217; H04N 21/23418; H04N 21/251; H04N 21/2668
  See application file for complete search history.

(56) References Cited

U.S. PATENT DOCUMENTS

| | | | |
|---|---|---|---|
| 8,503,523 B2 | 8/2013 | Williams et al. | |
| 8,995,823 B2 | 3/2015 | O'Kelly et al. | |
| 9,378,423 B2 | 6/2016 | Neumann et al. | |
| 9,715,901 B1* | 7/2017 | Singh | H04N 21/8547 |
| 10,062,412 B2 | 8/2018 | Liu et al. | |
| 10,356,456 B2* | 7/2019 | Ranjeet | G11B 27/031 |
| 2015/0172787 A1* | 6/2015 | Geramifard | H04N 21/252 725/40 |
| 2016/0014482 A1* | 1/2016 | Chen | H04N 21/8456 386/241 |

OTHER PUBLICATIONS

Baek, Y. et al., "Character Region Awareness for Text Detection", In Proceedings of the IEEE Conference on Computer Vision and Pattern Recognition, 2019, pp. 9365-9374.
Feichtenhofer, C. et al., "SlowFast Networks for Video Recognition", Facebook AI Research (FAIR), 2019, pp. 6202-6211.
Feifei Zhang, et al., "Joint pose and expression modeling for facial expression recognition." In Proceedings of the IEEE conference on computer vision and pattern recognition, pp. 3359-3368, 2018.

(Continued)

*Primary Examiner* — Nnenna N Ekpo
(74) *Attorney, Agent, or Firm* — Eversheds Sutherland (US) LLP

(57) ABSTRACT

Methods and apparatus are described for generating compelling preview clips of media presentations. Compelling clips are identified based on weighted combinations of attribute scores determined for indices of a media presentation. One or more of these compelling clips are then provided to a client device for playback.

20 Claims, 6 Drawing Sheets

| Timestamp | Face | Fighting | Car Chase | Angry | Happy | Rude Gesture |
|---|---|---|---|---|---|---|
| 1:00:10 | 0.05 | 0.31 | 0.50 | 0.00 | 0.00 | 0.33 |
| 1:00:11 | 0.14 | 0.31 | 0.50 | 0.00 | 0.00 | 0.33 |
| 1:00:12 | 0.15 | 0.31 | 0.50 | 0.00 | 0.00 | 0.33 |
| 1:00:13 | 0.52 | 0.31 | 0.50 | 0.00 | 0.00 | 0.33 |
| 1:00:14 | 0.33 | 0.31 | 0.50 | 0.00 | 0.00 | 0.33 |
| 1:00:15 | 0.05 | 0.00 | 0.49 | 0.68 | 0.50 | 0.00 |
| 1:00:16 | 0.96 | 0.00 | 0.49 | 0.68 | 0.50 | 0.00 |
| 1:00:17 | 0.69 | 0.00 | 0.49 | 0.68 | 0.50 | 0.00 |
| 1:00:18 | 0.71 | 0.00 | 0.49 | 0.68 | 0.50 | 0.00 |
| 1:00:19 | 0.93 | 0.00 | 0.49 | 0.68 | 0.50 | 0.00 |
| 1:00:20 | 0.58 | 0.00 | 0.74 | 0.00 | 0.69 | 0.70 |
| 1:00:21 | 0.23 | 0.00 | 0.74 | 0.00 | 0.69 | 0.70 |
| 1:00:22 | 0.17 | 0.00 | 0.74 | 0.00 | 0.69 | 0.70 |

Table 1

| Face | Fighting | Car Chase | Angry | Happy | Rude Gesture |
|---|---|---|---|---|---|
| 0.6 | 0.2 | 0.3 | 0.2 | 0.9 | -0.7 |

Table 2

| Timestamp | Compelling-ness Score |
|---|---|
| 1:00:10 | 0.01 |
| 1:00:11 | 0.07 |
| 1:00:12 | 0.07 |
| 1:00:13 | 0.30 |
| 1:00:14 | 0.18 |
| 1:00:15 | 0.76 |
| 1:00:16 | 1.31 |
| 1:00:17 | 1.14 |
| 1:00:18 | 1.16 |
| 1:00:19 | 1.29 |
| 1:00:20 | 0.70 |
| 1:00:21 | 0.49 |
| 1:00:22 | 0.45 |

Table 3

(56) References Cited

OTHER PUBLICATIONS

Florian Schroff, et al., "Facenet: A unified embedding for face recognition and clustering." In Proceedings of the IEEE conference on computer vision and pattern recognition, pp. 815-823, 2015.
Itur BS. "Algorithms to measure audio programme loudness and true-peak audio level." International Telecommunication Union, Tech. Rep, 4:1770, 2015.
Rasmus Rothe, et al.,"Dex: Deep expectation of apparent age from a single image." In Proceedings of the IEEE international conference on computer vision workshops, pp. 10-15, 2015.
Smaira, L. et al., "A Short Note on the Kinetics-700-2020 Human Action Dataset", Paper, 2020, 5 pages.
U.S. Notice of Allowance dated Feb. 16, 2022 issued in U.S. Appl. No. 17/247,324.
U.S. Appl. No. 17/247,324, Chen et al., filed on Dec. 7, 2020.
U.S. Appl. No. 17/662,608, Chen et al, filed on May 9, 2022.

\* cited by examiner

Attribute

| Timestamp | Face | Fighting | Car Chase | Angry | Happy | Rude Gesture |
|---|---|---|---|---|---|---|
| 1:00:10 | 0.05 | 0.31 | 0.50 | 0.00 | 0.00 | 0.33 |
| 1:00:11 | 0.14 | 0.31 | 0.50 | 0.00 | 0.00 | 0.33 |
| 1:00:12 | 0.15 | 0.31 | 0.50 | 0.00 | 0.00 | 0.33 |
| 1:00:13 | 0.52 | 0.31 | 0.50 | 0.00 | 0.00 | 0.33 |
| 1:00:14 | 0.33 | 0.31 | 0.50 | 0.00 | 0.00 | 0.33 |
| 1:00:15 | 0.05 | 0.00 | 0.49 | 0.68 | 0.50 | 0.00 |
| 1:00:16 | 0.96 | 0.00 | 0.49 | 0.68 | 0.50 | 0.00 |
| 1:00:17 | 0.69 | 0.00 | 0.49 | 0.68 | 0.50 | 0.00 |
| 1:00:18 | 0.71 | 0.00 | 0.49 | 0.68 | 0.50 | 0.00 |
| 1:00:19 | 0.93 | 0.00 | 0.49 | 0.68 | 0.50 | 0.00 |
| 1:00:20 | 0.58 | 0.00 | 0.74 | 0.00 | 0.69 | 0.70 |
| 1:00:21 | 0.23 | 0.00 | 0.74 | 0.00 | 0.69 | 0.70 |
| 1:00:22 | 0.17 | 0.00 | 0.74 | 0.00 | 0.69 | 0.70 |

Table 1

Attribute Weights

| Face | Fighting | Car Chase | Angry | Happy | Rude Gesture |
|---|---|---|---|---|---|
| 0.6 | 0.2 | 0.3 | 0.2 | 0.9 | -0.7 |

Table 2

| Timestamp | Compelling-ness Score |
|---|---|
| 1:00:10 | 0.01 |
| 1:00:11 | 0.07 |
| 1:00:12 | 0.07 |
| 1:00:13 | 0.30 |
| 1:00:14 | 0.18 |
| 1:00:15 | 0.76 |
| 1:00:16 | 1.31 |
| 1:00:17 | 1.14 |
| 1:00:18 | 1.16 |
| 1:00:19 | 1.29 |
| 1:00:20 | 0.70 |
| 1:00:21 | 0.49 |
| 1:00:22 | 0.45 |

Table 3

*FIG. 1*

IDENTIFYING COMPELLING SCENES AT SCALE BY MAPPING CHARACTERISTICS

BACKGROUND

Users have an ever-increasing array of options for consuming media presentation, in terms of the types of media presentation (e.g., video, audio, etc.), providers of the media presentation, and devices for consuming the media presentation. Media presentation providers are becoming increasingly sophisticated and effective at providing media presentation quickly and reliably to users.

Given the wide variety of available content, users may find it difficult to decide what to watch. Providing a short but compelling preview of media presentation may help users make an informed decision about what to watch. Unfortunately, the content in a preview may not be tailored to a specific customer's preferences and so may not adequately support such decision making. Furthermore, it is difficult to identify compelling clips of media presentation without time-intensive manual review and labeling.

BRIEF DESCRIPTION OF DRAWINGS

FIG. 1 illustrates an example of a particular class of implementations for identifying and selecting compelling preview clips.

DETAILED DESCRIPTION

Figure 2:
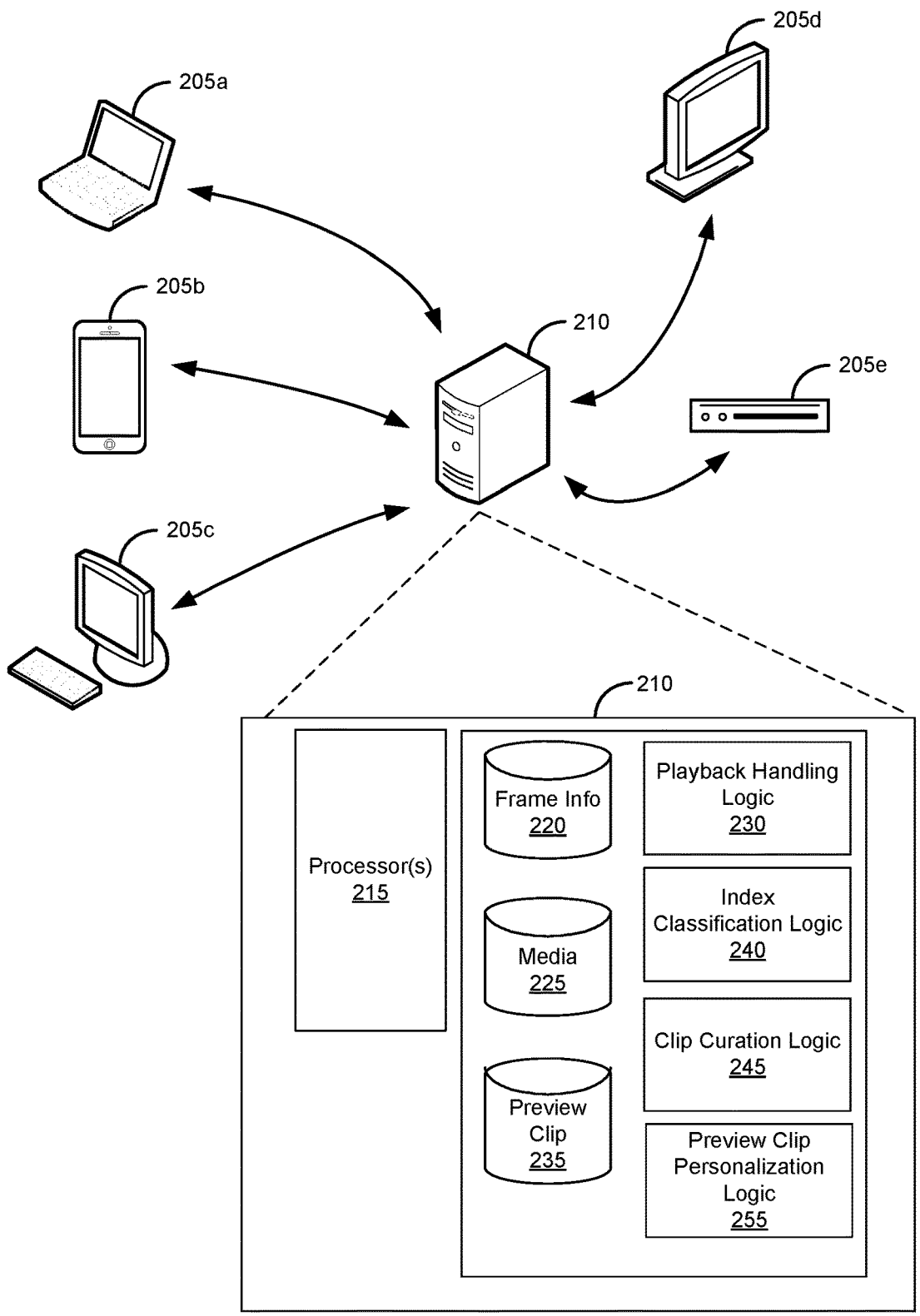
FIG. 2 illustrates an example of a computing environment in which implementations enabled by the present disclosure may be practiced.

This disclosure describes techniques for identifying clips of compelling scenes associated with a media presentation and providing such clips (e.g., as previews) based on user preferences or other characteristics. A "clip" is a sequence of successive frames of a media presentation. Clips corresponding to compelling scenes may be identified based on a compelling-ness score. Compelling-ness scores may represent a weighted combination of various attributes determined for selected portions of the media presentation, e.g., specific indices, frames, sequences of frames, groups of pictures (GOPs), scenes, etc. As will be described, clips may be identified based on the compelling-ness scores for selected indices of a media presentation and used to provide personalized sequences as, for example, previews in an interface used by a viewer for media presentation selection. These personalized previews are intended to help users discover content they may be inclined to watch. An example may be instructive.

FIG. 1 presents 3 Tables for determining compelling-ness scores that may be used to identify compelling clips. Table 1 is an attribute matrix presenting attribute scores for each of a plurality of selected indices of a media presentation. In the depicted example, each row represents one second of a media presentation. However, it should be understood that other implementations are possible, including a row for each frame, every 10 frames, every GOP, every scene, etc. Table 1 also includes 6 columns that represent attributes associated with each index. It should be understood that some implementations may include many more attributes, e.g., more than about 50 attributes. Some attributes may indicate properties of the portion of the media presentation associated with an index, such as average face area or loudness. Some attributes may represent a probability of that attribute being present in or associated with the corresponding index, for example a probability that the portion of the media presentation associated with the index includes fighting, a car chase, angry or happy expressions, or a rude gesture. Methods of determining these attributes are discussed further herein.

In Table 1 some attribute values are repeated for multiple indices, for example the value for fighting is the same for timestamps 1:00:10-14. In some implementations an attribute value may be determined based on a sequence of a media presentation, and thus in the attribute matrix of Table 1 each index of the sequence may have the same attribute value. Alternatively, some attribute values may be determined for each index, such as the face attribute. Other attributes may be determined for smaller intervals than a second, e.g., per frame or per 10 frames, and then combined to determine a single value for the corresponding index associated with those frames.

Some attribute values in Table 1 are zero, for example the values for angry and happy for timestamps 1:00:10-14. In Table 1 the attribute values are filtered such that, for a group of attributes, only the highest attribute values are provided in the attribute matrix. It is unlikely for a single timestamp to include fighting, car chases, angry expressions, happy expressions, and rude gestures. Thus, for Table 1, only the highest 3 probabilities are provided, and the other attribute values are set to zero.

Table 2 presents an attribute weights vector. The attribute weights vector represents how compelling the various attributes are for various users. In Table 2, happy expressions carry a relatively high weighting of 0.9, representing that indices with expressions of happiness are more compelling. Conversely, rude gestures has a negative weight of −0.7, representing that indices with rude gestures are particularly non-compelling. While a single attributes weight vector is presented in Table 2, in some implementations there may be multiple attribute weight vectors, each corresponding to different types of compelling clips (for example, one attribute weight vector may be associated with users who prefer action movies, while another attribute weight vector may be associated with users who prefer romantic movies).

Table 3 presents a compelling-ness score vector including compelling-ness scores for each index. The compelling-ness score is determined by a dot product of the attribute weights vector with each row of the matrix of Table 1. A higher compelling-ness score indicates that the portion of the media presentation associated with that index is more compelling for a user. While only a single compelling-ness score vector is shown in Table 3, in some implementations multiple vectors may be present, each corresponding to a different attribute weights vector.

Clips may then be identified based on the compelling-ness score. In Table 3, timestamp 1:00:19 has the highest compelling-ness score, thus a clip may be identified that includes timestamp 1:00:19. As will be described further herein, clips may also be identified based on shot boundaries, clip compelling-ness scores, and suppression of inappropriate content.

The identified clips are then provided to a personalization engine. When a user is browsing a media service to find a media presentation to watch, the personalization engine selects one or more of the compelling clips based on preferences and/or characteristics of the user or user device and features of the compelling clips. The selected clip(s) are then provided to the user device for playback, e.g., as a preview.

FIG. 2 illustrates an example of a computing environment in which personalized preview clips may be generated and presented as enabled by the present disclosure. The computing environment of FIG. 2 includes media server 210 which can be used to provide a media presentation for playback on devices 205a-e.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media presentations herein is merely by way of example. Suitable alternatives known to those of skill in the art may be employed.

Media server 210 may be part of a content delivery system that conforms to any of a wide variety of architectures. The functionality and components of media server 210 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc.

Media server 210 can include various types of logic used to provide media presentations for playback at devices 205a-e. In FIG. 2, media server 210 includes media presentation storage 225, frame information 220, and preview clip information 235. Media server 210 also includes playback handling logic 230, preview clip identification logic 240, preview clip curation logic 245, and preview clip personalization logic 255.

Media presentation storage 225 stores a variety of media presentations for playback on devices 205a-e, such as episodes of television shows, movies, music, etc. Preview clip information 235 can be a storage mechanism, such as a database, storing metadata relating to preview clips corresponding to subsets of frames of television shows. For example, preview clips of every episode of a television show stored in media presentation storage 225 can be represented by an episode identifier, a start time, and an end time stored in preview clip information 235. In some implementations, each preview clip in preview clip information 235 may be associated with additional information, such as, for example, an importance ranking, relationship to other preview clips, relationship to a corresponding scene, a category (e.g., action, romance, etc.), a setting, included actors, closed-captioned data providing a transcript of the dialogue in the preview clip, script data providing production details, a plot arc identifier, user rankings or commentary, trivia, and so forth.

In certain implementations, at least some of the contents of preview clip information 235 may be generated automatically. For example, image processing of video frames to identify shot boundaries, changes in scenery, and/or characters depicted, audio processing to determine loudness and detect changes in music, ambient audio, and dialogue, and natural language processing of textual data in the script or available subtitles to perform content and sentiment analysis, may each contribute to both selecting preview clips for a media presentation and associating metadata with the preview clips.

It should be appreciated that the techniques for generating personalized preview clip sequences as described herein are compatible with a wide variety of time frames for the generation of preview clip information 235. For example, for a television show having multiple seasons and episodes, personalized preview clip sequences can use preview clip information 235 that may have been generated months in advance, such as at the time of production of the television show episode.

Media server 210 also can include one or more processors 215, memory, and other hardware for performing the tasks disclosed herein. For example, playback handling logic 230 determines whether a request for a preview clip of a media presentation has been received from a viewer device, identifies the media presentation being requested, and retrieves user preferences associated with the viewer device. Playback handling logic 230 also performs tasks relating to generating and providing manifest data representing preview clips.

Index classification logic 240 performs tasks relating to determining attributes of indices from media presentations, identifying shot boundaries, ranking or selecting clips according to various metrics, and selecting clips to be used for personalized previews. Clip curation logic 245 performs tasks relating to reviewing selected clips for quality control purposes.

In some implementations, preview clip information 235, which stores metadata relating to preview clips, can also be used to store the preview clips themselves. For example, each preview clip may be stored as a data structure including fields corresponding to preview clip identifiers, start and stop time modifiers, and, in some implementations, viewer device or account identifiers.

Preview clip identification logic 240 and/or preview clip curation logic 245 can interface to preview clip personalization logic 255. Preview clip personalization logic 255 performs tasks related to analysis of preview clips and/or selecting preview clips to provide to a user. For example, in certain implementations, the selection of preview clips may be based on the relationship between the current playback history of a viewer device and a change in playback history for other viewer devices. For instance, a media server can lookup information relating to preview clips previously generated for other viewer devices. The lookup process can return a set of preview clips that were previously generated for a similar configuration of media presentation and device attributes. Each clip in the set may also have an associated field indicating whether the viewer device for which the clip was provided eventually watched the media presentation. Alternatively, the media server can retrieve the current playback history for viewer devices corresponding to the set of clips to determine whether the media presentation was eventually watched.

The preview clip(s) provided to any one of devices 205a-e can be based on the clip in the set of clips associated with the highest probability of a viewer device eventually watching all episodes of the media presentation.

In some implementations, such analyses of different preview clip sequences are used as inputs to a machine learning algorithm, such as, for example, neural networks, for modifying the criteria for identification, curation, and/or personalization of preview clips to maximize a particular objective, such as completion of the entire media presentation. In some implementations, preview clip personalization logic 255 may include a recommender that uses preview clip metadata, user preferences, and device information to rank and/or select a preview clip to provide to a user.

A specific implementation in which one or more previews are generated for a media presentation will now be described with reference to the computing environment of FIG. 2 and the flow diagrams of FIGS. 3, 4, and 5. Starting in block 300, attribute scores for a media presentation are determined. As mentioned above, a media presentation may be segmented based on a plurality of indices. In various implementations each index may correspond to a single frame, multiple frames, a single second, or multiple seconds. Attribute scores may be identified for each index. Attributes may include faces, loudness, actions, emotions, celebrity recognition, video compliance attributes (e.g., nudity, drug use, obscenity), visual search corresponding to trailers, etc. In some implementations some of the attribute scores represent a probability and/or confidence level that the corresponding attribute is present within or applies to the corresponding portion of the media presentation, e.g., a probability that the associated portion of the media presentation includes a car chase or a particular celebrity. In some implementations some of the attribute scores may represent a value of a particular characteristic, e.g., the average face area across frames or the average loudness.

In various implementations, attribute scores may be determined based on all or less than all media content associated with an index. In some implementations an attribute score may be based on a sampling of the frames associated with an index, e.g., one frame per index or about 5 frames per second, rather than all frames associated with that index. Some attributes of a media presentation may not significantly change between frames within a second duration, and thus determining an attribute score using fewer than all frames may be more efficient.

In some implementations an attribute score may repeat across indices. As discussed further in relation to FIG. 4, some attribute scores may be determined based on segments of a media presentation that include multiple indices. Thus, an attribute score determined for a segment may be used for all indices associated with that segment.

In some implementations the media presentation is divided based on indices that correspond with the highest frequency of attribute scores. For example, if an attribute score for a first attribute is determined for each 10-frame segment, then the indices may represent 10 frames such that each of the attribute scores for the first attribute correspond with a single index. Attribute scores that are determined at a lower frequency may be repeated across indices. Alternatively, in some implementations an attribute score may represent a combination of attribute scores. Returning to the example above, assuming a media presentation has 30 frames per second and that one index may represents one second, the attribute scores for the first attribute for each index may be a combination of the attribute scores, e.g., a summation or average of three attribute scores.

In block 310 compelling-ness scores are determined for each index. Compelling-ness scores may be determined by applying a set of attribute weights to the attribute scores and then summing the weighted attribute scores. In some implementations an attribute weight vector represents the compelling-ness of various attributes. In some implementations the attribute weights may include positive values for attributes that are compelling and negative values for attributes that are non-compelling. In some implementations there may be multiple sets of attribute weights. Each set of attribute weights may correspond with a type of user (e.g., users that prefer action scenes vs. users that prefer romantic scenes). In such implementations, blocks 310-350 may be performed for each set of attribute weights to identify compelling clips.

In some implementations some of the indices may be suppressed or otherwise labeled as inappropriate. For example, graphic content, which may include drug use, nudity, and/or obscene content, may be inappropriate for use in a preview clip. In some implementations the attributes may include graphic content attributes, and indices that have an attribute score for graphic content that exceeds a threshold may not be used for identifying clips. In some implementations, the last portion of a media presentation is suppressed for purposes of clip generation, as there is a high likelihood that a clip generated from such portion would contain spoilers. In some implementations the last 20% of the indices of a media presentation are suppressed to avoid a preview clip containing a spoiler. In some implementations a compelling-ness score is not determined for suppressed indices.

In block 320 clips are identified based on the indices having the highest compelling-ness scores. In some implementations a threshold number of clips are identified based on the highest ranked indices as ranked by compelling-ness score. In some implementations clips are generated for all indices, subject to other limitations as described herein, e.g., suppressed indices. In some implementations a clip may be defined by a set of indices corresponding to that clip. In some implementations, clips are identified but not generated in block 320. Clips may be identified based on a start and end timestamp or index. This may increase efficiency since, as will be discussed further below, not all clips that are identified may be selected as clips to use for playback at a client device. As each clip may be defined by a sequence of indices, various operations described herein may be performed using values associated with the indices corresponding to a clip without having to generate that clip.

In some implementations the start and end of the clip are identified based on shot boundaries. A "shot" is a sequence of successive frames of the media presentation that are visually similar (e.g., frames belonging to the same scene). Shot boundaries correspond to time stamps within a media presentation at which adjacent frames are visually distinct, e.g., representing a cut to a different shot. Consecutive frames within a shot typically share many visual features, while consecutive frames across two different shots are often dramatically different. A shot boundary may be inferred based on this difference between two consecutive frames. The entire media presentation may be processed to determine such shot boundaries. For example, a media presentation that is about 45 minutes long might have about several hundred shots, with corresponding shot boundaries between each shot.

In some implementations, the start and/or the end of the clip identified for an index are determined such that a threshold number of shots precede and/or succeed the index.

For example, it may be preferable for the compelling index to be presented near the beginning of a clip to capture a viewer's attention, thus, a threshold of 1 or 2 shots prior to the compelling index may be used to identify the start of the clip. Other thresholds may be used.

In some implementations, the clips have a predetermined nominal length, e.g., about 30 seconds, about 45 seconds, about 60 seconds, about 90 seconds, or about 120 seconds. In some implementations, the clips may start or end on a shot boundary. In some implementations, the clips may start and end on a shot boundary. Particularly in the case of the latter type of implementation, it is typically not possible to have clips of uniform length while still starting and ending on a shot boundary. In such implementations, the start of a clip may be selected based on a shot boundary as noted above, and the end of the clip is selected to be the shot boundary closest to the desired nominal length. For example, if the desired clip length is 45 seconds, the start of the clip may be at one shot boundary, and the end of the clip being selected to be a later shot boundary closest to 45 seconds. Thus, if there are shot boundaries 44 seconds and 47 seconds after the first shot boundary, the clip may be constrained to 44 seconds so that it ends at the corresponding shot boundary. In some implementations, there may be additional rules regarding clips having a minimum or maximum length, such that the selected shot boundary may not be the closest shot boundary (for example, if the clip must have a minimum length of 45 seconds, in the above example the clip would instead end at the shot boundary 47 seconds after the first shot boundary).

In some implementations, the start and/or end of the clip identified for an index are also identified based on voice activity at the shot boundaries defining the start or end of the clip. The start and/or end of the clip may be selected such that the clip does not begin or end in the middle of dialogue.

In some implementations suppressed indices may also not be included in any clips that are identified for adjacent indices. For example, a first index that is not suppressed for graphic content may be near a second index that is suppressed for graphic content. A clip may be identified for the first index based on its compelling-ness score. In some implementations the clip identified for the first index may, in order to satisfy clip identification constraints such as clip length, ostensibly include the second index that is suppressed. In such implementations a valid clip may not be identifiable for the first index, as the clip would either include the suppressed index or fail to exceed a threshold clip length. In such implementations one or more of the clip identification constraints may be modified such that the second index is not included in the identified clip. For example, rather than the start timestamp for the clip being 1-2 shots before the first index, the start timestamp may be identified so that the second index is not included in the identified clip. In other implementations a clip may not be identified for the first index despite it not being suppressed graphic content and having a high compelling-ness score, based on the clip including timestamps flagged as suppressed.

In block 330, a clip compelling-ness score may be determined for each clip. Clips corresponding to compelling scenes may be identified based on having a high compelling-ness score for the indices within that clip. The clip compelling-ness score may be some combination (e.g., an average, sum, etc.) of the compelling-ness score for each index in the clip.

In block 340 clips are selected based on the clip compelling-ness scores. The clips may be ranked based on the clip compelling-ness scores. In some implementations, a predetermined number of clips are selected, for example the top 5, 10, or 20 clips. The highest ranking clips may be additionally selected to avoid redundancy resulting from the overlap of clips. Indices may be included in multiple clips. If a continuous sequence of indices of a media presentation have high compelling-ness scores, each clip that includes that sequence of indices will be highly ranked. Because it is desirable to have a diverse set of clips for curation, personalization, and/or presentation, it is desirable to avoid having the selected clips contain overlapping indices of the media presentation.

To address this issue, in some implementations, clips are selected based on both rank and the proximity of indices between clips. In such implementations, clips are selected to ensure each of the selected clips is non-overlapping and separated from any of the other selected clips. This is accomplished by ensuring that there is a minimum separation (e.g., some number of indices or duration of content) between each of the indices in a highly ranked clip and any index within any other clip. For example, if the highest ranked clip includes indices 1:20:20-50, and the minimum separation is 2 minutes, then none of the other selected clips may include any timestamp from 1:18:20-22:50 to avoid overlapping content between clips. In some implementations the minimum separation may vary considerably, e.g., between about 30 seconds and about 5 minutes. It should be noted that this may result in selecting clips that are not otherwise highly ranked relative to the highest ranked clips in the entire set of clips. However, this also results in the selected clips having little or no overlap; a desirable result in that a more diverse set of clips better supports subsequent personalization.

In block 350 the selected clips are reviewed. In some implementations block 350 may comprise automated reviewing of selected clips, in comparison to review by a human operator. In some implementations, clips may be reviewed to determine whether they include opening credits. Opening credits typically include text or other graphics that may be disruptive to a viewing experience. In some implementations, a machine learning model processes an initial segment of a media presentation to detect opening credits. In some implementations the initial segment may be the first 20 minutes of a movie. The model may detect text boxes within a frame and compare the brightness of pixels within the box. A difference in foreground and background luminance scores that exceeds a threshold indicates the presence of opening credits that may be disruptive. In some implementations opening credits may be an attribute, such that indices having a high attribute score for opening credits may be suppressed or reduce the compelling-ness score for that index (i.e. by having a negative weight).

In some implementations the selected clips are filtered based on luminance. Brighter clips typically are better at capturing a user's attention, thus, clips that are not bright may be less compelling and undesirable for use as a preview clip. FIG. 5 presents a flowchart illustrating how luminance may be used to filter clips. Luminance may be determined using the luma component from a YUV color encoding system. In block 510, a luminance score is calculated based on the average luminance of pixels in sampled frames of each clip. The frame sampling rate may be about 1 frame per second, more than one frame per second, or less than one frame per second. The average luminance of each sampled frame of a clip may be averaged across the sampled frames to determine a luminance score for that clip.

In block 520, a luminance threshold is determined. In some implementations the threshold is based on an average luminance of the media presentation. The average luminance of the media presentation may be calculated by sampling frames and determining the average luminance across all pixels and all sampled frames, similar to how the luminance score for each clip is determined. In this manner the threshold may be normalized across media presentations. In some implementations the threshold is additionally based on a multiplier that is applied to the average luminance of the media presentation.

In block 530 clips are filtered based on the luminance threshold. Any clips that do not exceed the threshold may be filtered out. In some embodiments a minimum number of clips are set to be selected. In such embodiments, if an insufficient number of clips exceed the luminance threshold, the luminance threshold may be reduced and the clips re-evaluated until a minimum number of clips is reached having a luminance score that exceeds the threshold. In some implementations the process of FIG. 5 may be performed during block 350 or block 340 of FIG. 3. In some implementations the clips may be initially selected based on exceeding the luminance threshold prior to selecting clips based on the ranking or overlap between clips.

In block 360 clips are generated. In some implementations the clips that are generated are identified clips having been selected in block 340 and not filtered out in block 350. In some implementations, the generated clips are reviewed by human operators. Selected and/or generated clips may be reviewed to ensure, for example, that the clip has a minimum length, or that the clip is of sufficient quality, e.g., it has no flickering, blurriness, lip-sync errors, graininess, or watermarks. The clips may also be reviewed for having a natural beginning and ending, e.g., not starting or stopping in the middle of someone speaking. In some implementations the selected clips may also be reviewed for graphic content or cultural sensitivities, such as violent or sexual content. In some implementations various parts of this review may also be performed in block 350 by an automated process, prior to generating clips. In some implementations block 360 may also include associating various metadata with the selected clips. For example, the clips may be tagged with which actors/actresses are in the clip, or that the clip is a character-themed clip. Such metadata may include actor profiles, critical commentary, user feedback, narrative descriptions, trivia, importance scores, association factor with a particular plot arc, and other information related to portions of the media presentation, such as a scene within an episode.

As may be evident, blocks 320-350 may be performed without generating any clips. During blocks 320-350, each clip may be represented by a sequence of timestamps and/or indices, such that many of the operations performed in blocks 320-350, including determining compelling-ness scores and clip review, are performed using the indices of the media presentation that correspond with a clip. This may be advantageous to increase processing efficiency, as clips are not generated that may not actually be selected for possible use in playback by a client device. Rather, the operations may be performed using various values, such as attribute scores, determined for each portion of a media presentation that is to be included in a clip. As clips may have significant overlap in content, performing operations of blocks 320-350 on values determined for each index of a clip may also reduce redundancy.

In block 370 one or more of the selected clips is provided to a client device for playback. When a client device is browsing options for media playback, using for example a service like Amazon Prime Video®, the client device may send requests to a media server for preview clips of the various media presentations available. Personalization logic employing a personalization model may receive the request, along with user preferences or other characteristics associated with the user and/or client device, to determine which of the selected clips to provide. User preferences may include, for example, celebrities, themes, moods, and genres. In some implementations the personalization model may receive contextual information associated with the client device, for example device type, placement, time of day, media player, etc.

The personalization model may be a recommender that determines, based on the information received from the client device and metadata associated with the selected clips, to provide one or more of the selected clips. For example, if user preferences associated with the device indicate the user prefers intense action scenes over dialogue, then a clip identified and selected based on loudness may be provided instead of or in addition to a character-themed clip identified and selected based on average face area.

In some implementations, the clip provided to the client device might also be based on a playback history associated with the client device. For example, if a user has watched the first three episodes of a series, the clip provided to the client device may be from episode 4 to provide the most relevant preview.

In some implementations, the personalization model may receive feedback to improve its recommendations. For example, the percent of users that selected a media presentation for playback after viewing a clip may be used to determine which of the selected clips is the better for a particular user.

In some implementations block 330 may not be performed. In such implementations clips may be selected based on the compelling-ness score for the index for which each clip is identified. In some implementations clips may be selected based on both rank and proximity of indices between clips, as described above.

Figure 4:
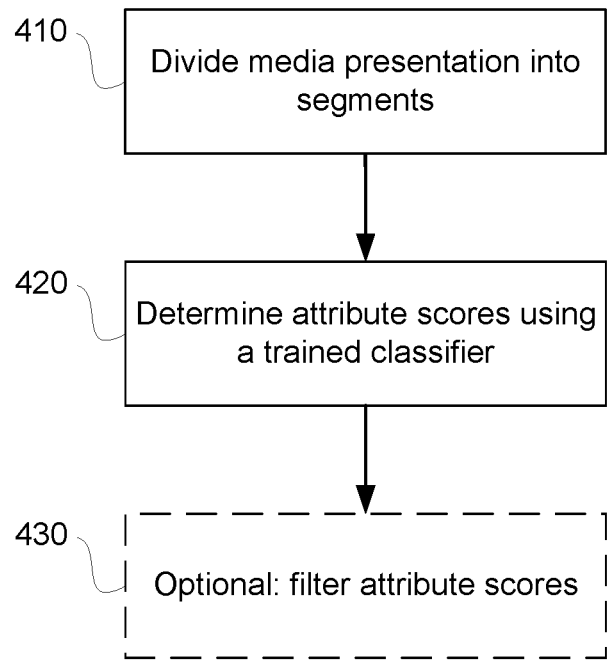
FIG. 4 presents a flowchart illustrating operations for an example embodiment of determining attribute scores for indices of a media presentation.
Figure 5:
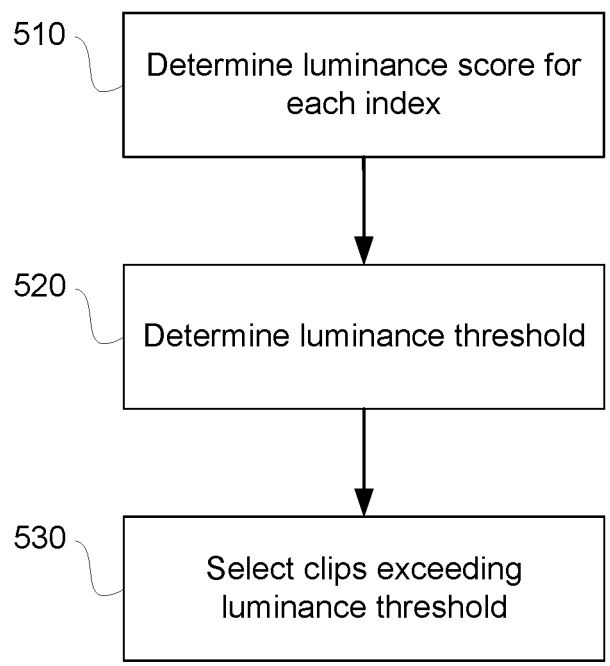
FIG. 5 presents a flowchart illustrating operations for selecting compelling clips based on luminance.

FIG. 4 presents a flow diagram for determining attributes for indices of a media presentation. In block 410 a media presentation is divided into segments. In some embodiments each segment may have a length of about 30 seconds, or between about 10 seconds and about 40 seconds. In some implementations the segments may be based on scene transitions or shot transitions, such that each segment corresponds to a single scene or a single shot in a media presentation.

In block 420 attribute scores are determined for each segment. Each segment may be provided to a classifier that is trained to output a probability for each of a plurality of attributes that that attribute corresponds with the segment. In some implementations the classifier is trained on segments that correspond with a plurality of action attributes and a plurality of emotion attributes, e.g., segments labeled "fighting" or "angry." The classifier may output a probability for each action attribute and each emotion attribute. It should be understood that multiple classifiers may also be used. In some implementations, the classifier is trained on segments that correspond with sub-attributes of one or more of the plurality of action attributes or one or more of the plurality of emotion attributes. For example, an action attribute may include "fighting," while a sub-attribute of fighting may be "punching." A classifier may undergo supervised learning on segments labeled as "punching," which the classifier learns to map to a secondary attribute of "fighting."

In some implementations the classifier may be a convolutional neural network having a slow pathway and a fast pathway. In some implementations the classifier is an inflated 3D network with a ResNet backbone, an inflated 3D network with an Inception backbone, or a SlowFast Network with a ResNet backbone. The slow pathway may be designed to sample fewer frames of a segment to determine spatial information, such as the size, location, and type of objects in the segment. The fast pathway, by contrast, may be designed to sample more frames of the segment to determine dynamic information, e.g., motion.

In some embodiments the fast pathway and slow pathway may be defined relative to each other. An alpha value may be used to define a ratio of sample rates between the fast and slow pathway. A higher alpha value (greater than 1) indicates the fast pathway samples more frames of the segment than the slow pathway. A beta value may be used as a ratio of channels between the fast and slow pathway. A lower beta value (between 0 and 1) indicates the fast pathway is using fewer channels than the slow pathway. Furthermore, the fast pathway and the slow pathway may have lateral connections that allow each pathway to be aware of the convolutions performed by the other pathway.

In block 430 the attribute scores may be optionally filtered. For a given segment, only a few attributes are likely to actually correspond to that segment. Thus, the attribute scores may be filtered to use the highest attribute scores. In some implementations the top 3 attribute scores may be used, while the other attribute scores output by the classifier are set to zero. In other implementations more or fewer attribute scores may be used. In some implementations, a threshold may be used, where all attribute scores below a threshold are reduced to zero. As will be appreciated, given the large number of indices for a media presentation and the relatively few non-zero attribute scores, each index may have a sparse vector where a few attribute scores are non-zero, but most are 0's. Such sparse vectors can improve the efficiency in performing calculations to identify compelling clips. In some implementations block 430 may be integrated with the classifier, such that the classifier only outputs the highest 3 attribute scores.

As described above, the attribute scores are determined for each segment. As a segment may include 30 seconds of the media presentation, the segment may include multiple indices (which may represent a single second). Thus, the attribute scores output for a segment may be set for all indices corresponding to that segment. In this manner, some of the attribute scores may repeat for long stretches of indices.

While a single classifier has been described in reference to FIG. 4, in some implementations, multiple classifiers and/or machine learning models may be used to determine various non-overlapping attribute scores. One classifier may be used to determine action and emotion attribute scores. Separate machine learning models may be used to identify famous actors, graphic content, or average face area. In some implementations multiple models may take the same segments as an input, outputting attribute scores for different, non-overlapping attributes.

Figure 6:
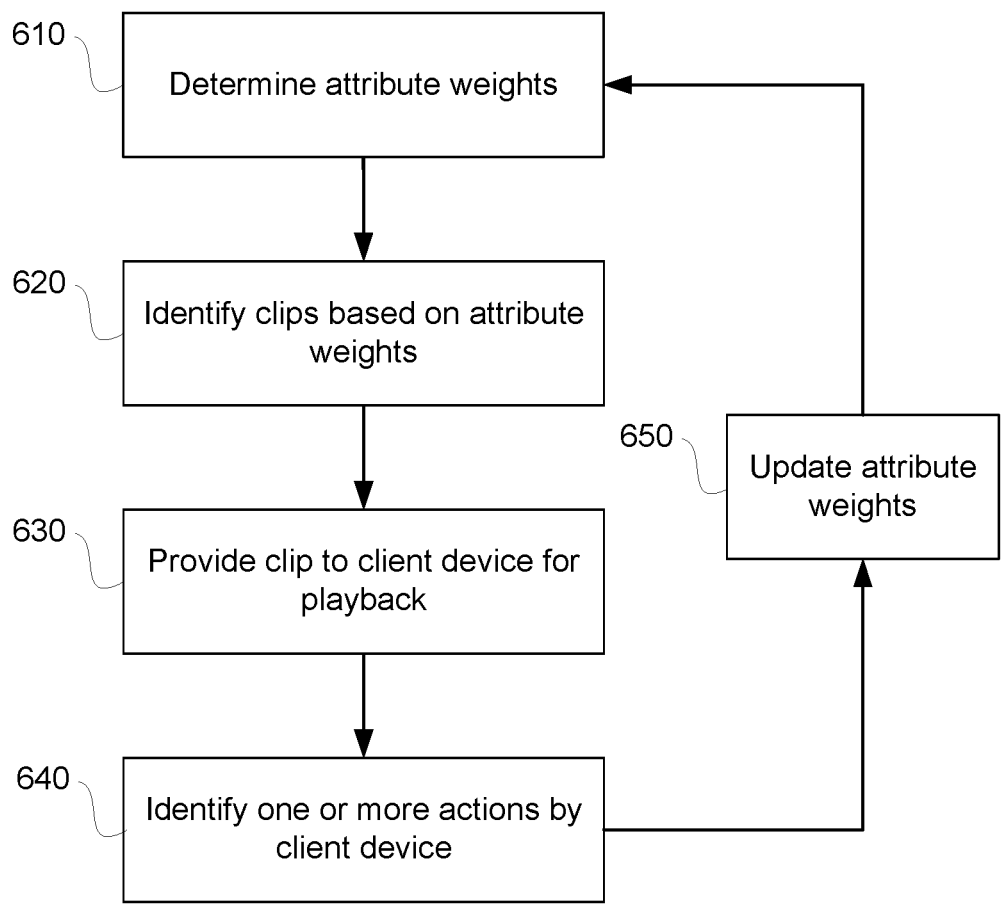
FIG. 6 presents a flowchart illustrating operations for updating attribute weights according to various implementations as described herein.

FIG. 6 presents a flow diagram for determining attribute weights for identifying compelling clips. As described above, attribute weights represent the compelling-ness of each attribute, and in some implementations, there may be multiple sets of attribute weights, each corresponding with a type of user. In some implementations the process of FIG. 6 may be performed as part of or simultaneously to the process of FIG. 3, e.g., block 610 may be performed during or prior to block 310 of FIG. 3.

Starting in block 610, attribute weights may be determined. Attribute weights may be initially determined based on prior experiments to determine attribute weights or feedback from reviewers of preview clips generated by an automatic clip generation process. In block 620 clips are identified based on the attribute weights. In some implementations block 610 may correspond with blocks 310-360, e.g., determining compelling-ness scores, identifying clips, and selecting clips.

In block 630 a clip is provided to a client device for playback, as described in block 370, above. In block 640, one or more actions by the client device are identified. Actions may include, e.g., selecting the clip for playback, duration of clip playback, completion of clip playback, purchase or selection of the corresponding media presentation for playback, likes/dislikes of the clip, ratings of the clip, etc.

In block 650 the attribute weights are updated based on the one or more actions. In some implementations, attribute weights may be updated over time as client devices take actions after receiving a clip for playback. Based on the actions taken by a user, the weights may be adjusted to better determine which indices and clips are highly compelling for users. In some implementations attribute weights may also be updated based on feedback from a human operator reviewing clips before providing them to a personalization engine. Clips that a human operator reject for use as preview clips may be analyzed to update the attribute weights. Various methods may be used to adjust the weights based on user actions taken in response to a clip generated by the implementations discussed herein. After the weights are adjusted in block 650, the process may return to block 610 where attribute weights are determined.

Figure 3:
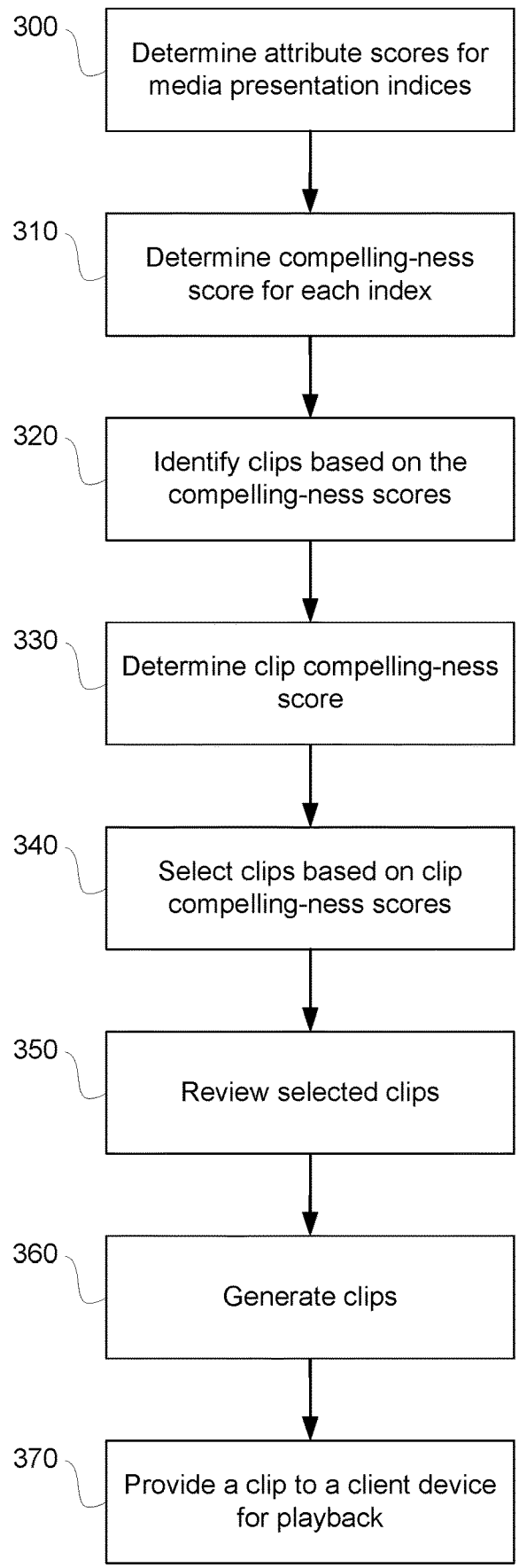
FIG. 3 presents a flowchart illustrating operations of examples of implementations as described herein.

It should be understood that the process of FIG. 6 may run concurrently or as part of the process of FIG. 3. For example, the processes described in FIG. 3 may be performed for multiple media presentations, and the attribute weights used to determine compelling-ness scores may be updated over time based on user actions taken in response to clips generated by the processes of FIGS. 3 and 6. Thus, different media presentations may used different attribute weights, even for the same type of user, based on updates to the attribute weights between when clips are generated for a first media presentation and when clips are generated for a second media presentation.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
   identifying a plurality of indices, each index corresponding to a continuous portion of a media presentation that is associated with one or more timestamps or one or more frames;
   determining a set of attribute scores for each index, wherein each attribute score represent a confidence level that a corresponding attribute applies to a corresponding portion of the media presentation, wherein at least some of the attribute scores are determined by applying a classifier trained on clips that correspond with one of a plurality of action attributes or one of a plurality of emotion attributes;
   applying a set of weights to the set of attribute scores, each weight representing a compelling-ness of an attribute;
   determining a compelling-ness score for each index based on the set of attribute scores and the set of weights;
   identifying a plurality of clips based on the compelling-ness scores, wherein each clip includes a contiguous range of content of the media presentation beginning and ending at corresponding shot boundaries, each clip corresponding to a contiguous range of the plurality of indices;
   determining a clip compelling-ness score for each clip of the plurality of clips based on the compelling-ness score for each index included in that clip;
   ranking the plurality of clips based on the clip compelling-ness scores;
   identifying a subset of the plurality of clips based on the ranking of the plurality of clips, and
   providing one or more clips of the subset of the plurality of clips to a first client device.

2. The method of claim 1, further comprising excluding a first clip from inclusion in the subset of the plurality of clips that includes overlapping content with a second clip included in the subset of the plurality of clips, wherein the second clip has a higher clip compelling-ness score than the first clip.

3. The method of claim 1, further comprising:
   identifying one or more actions associated with the first client device in relation to the media presentation; and
   updating the set of weights based on the one or more actions.

4. The method of claim 1, further comprising:
   determining that a first subset of the plurality of indices correspond with graphic attributes; and
   not including the first subset of the plurality of indices in the plurality of clips.

5. A method, comprising:
   identifying a plurality of indices, each index corresponding to a portion of a media presentation that is associated with one or more timestamps or one or more frames;
   determining a set of attribute scores for each index, each attribute score of a subset of the attribute scores representing a confidence level that a corresponding attribute applies to the corresponding portion of the media presentation, wherein the subset of attribute scores includes attribute scores for a plurality of action attributes and a plurality of emotion attributes;
   applying a set of weights to the set of attribute scores, each weight representing a compelling-ness of an attribute;
   determining a compelling-ness score for each index based on the set of attribute scores and the set of weights;
   identifying a plurality of clips based on the compelling-ness scores corresponding to the indices within each respective clip of the plurality of clips; and
   providing one or more clips of the plurality of clips to a first client device.

6. The method of claim 5, further comprising:
   determining the attribute scores for the plurality of the action attributes and the plurality of emotion attributes by applying a classifier trained on segments that correspond with one of the plurality of action attributes or one of the plurality of emotion attributes.

7. The method of claim 5, further comprising:
   identifying one or more actions associated with the first client device in relation to the media presentation; and
   updating the set of weights based on the one or more actions.

8. The method of claim 5, further comprising:
   determining that a first subset of the plurality of indices correspond with graphic attributes; and
   excluding the first subset of the plurality of indices from the plurality of clips.

9. The method of claim 5, wherein identifying the plurality of clips is further based on shot boundaries, voice activity, a threshold number of shots prior to an index having a high compelling-ness score, or any combination thereof.

10. The method of claim 5, further comprising:
    determining a clip compelling-ness score for each clip of the plurality of clips based on the compelling-ness score for each index corresponding to that clip,
    identifying a subset of the plurality of clips based on the clip compelling-ness scores, and
    providing one or more clips of the subset of the plurality of clips to the first client device.

11. The method of claim 10, further comprising excluding a first clip from inclusion in the subset of the plurality of clips that includes overlapping content with a second clip included in the subset of the plurality of clips, wherein the second clip has a higher clip compelling-ness score than the first clip.

12. The method of claim 5, wherein an average luminance score for each clip of the plurality of clips exceeds a threshold, wherein the threshold is based on an average luminance of the media presentation.

13. A system, comprising memory and one or more processors configured to:
    identify a plurality of indices, each index corresponding to a portion of a media presentation that is associated with one or more timestamps or one or more frames;
    determine a set of attribute scores for each index, each attribute score of a subset of the attribute scores representing a confidence level that a corresponding attribute applies to the corresponding portion of the media presentation, wherein the subset of attribute scores includes attribute scores for a plurality of action attributes and a plurality of emotion attributes;
    apply a set of weights to the set of attribute scores, each weight representing a compelling-ness of an attribute;
    determine a compelling-ness score for each index based on the set of attribute scores and the set of weights;
    identify a plurality of clips based on the compelling-ness scores corresponding to the indices within each respective clip of the plurality of clips; and
    provide one or more clips of the plurality of clips to a first client device.

14. The system of claim 13, wherein the memory and one or more processors are further configured to:
  determine the attribute scores for the plurality of action attributes and the plurality of emotion attributes by applying a classifier trained on segments that correspond with one of the plurality of action attributes or one of the plurality of emotion attributes.

15. The system of claim 13, further comprising:
  identifying one or more actions associated with the first client device in relation to the media presentation; and
  updating the set of weights based on the one or more actions.

16. The system of claim 13, wherein the memory and one or more processors are further configured to:
  determine that a first subset of the plurality of indices correspond with graphic attributes; and
  exclude the first subset of the plurality of indices from the plurality of clips.

17. The system of claim 13, wherein the memory and one or more processors are further configured to identify the plurality of clips based on shot boundaries, voice activity, a threshold number of shots prior to an index having a high compelling-ness score, or any combination thereof.

18. The system of claim 13, wherein the memory and one or more processors are further configured to:
  determine a clip compelling-ness score for each clip of the plurality of clips based on the compelling-ness score for each index corresponding to that clip,
  identify a subset of the plurality of clips based on the clip compelling-ness scores, and
  provide one or more clips of the subset of the plurality of clips to the first client device.

19. The system of claim 18, wherein the memory and one or more processors are further configured to exclude a first clip from inclusion in the subset of the plurality of clips that includes overlapping content with a second clip included in the subset of the plurality of clips, wherein the second clip has a higher clip compelling-ness score than the first clip.

20. The system of claim 13, wherein an average luminance score for each clip of the plurality of clips exceeds a threshold, wherein the threshold is based on an average luminance of the media presentation.

* * * * *